(12) United States Patent
Martin et al.

(10) Patent No.: US 12,007,658 B2
(45) Date of Patent: Jun. 11, 2024

(54) METHOD FOR PROTECTING A GLASS SUBSTRATE COATED WITH AN ELECTROCHROMIC STACK AND METHOD FOR PRODUCING AN INSULATING GLAZING

(71) Applicant: SAINT-GOBAIN GLASS FRANCE, Courbevoie (FR)

(72) Inventors: Florent Martin, Paris (FR); Charline Lalande, Paris (FR); Bertrand Heurtefeu, Tremblay-en-France (FR); Jean-Christophe Giron, Edina, MN (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 159 days.

(21) Appl. No.: 17/436,428

(22) PCT Filed: Mar. 13, 2020

(86) PCT No.: PCT/EP2020/056988
§ 371 (c)(1),
(2) Date: Sep. 3, 2021

(87) PCT Pub. No.: WO2020/183019
PCT Pub. Date: Sep. 17, 2020

(65) Prior Publication Data
US 2022/0163862 A1 May 26, 2022

(30) Foreign Application Priority Data
Mar. 14, 2019 (FR) ...................................... 1902628

(51) Int. Cl.
*G02F 1/153* (2006.01)
*C03C 17/42* (2006.01)

(52) U.S. Cl.
CPC ............ *G02F 1/1533* (2013.01); *C03C 17/42* (2013.01); *C03C 2218/328* (2013.01); *C03C 2218/355* (2013.01)

(58) Field of Classification Search
CPC ............................................. C03C 2218/355
See application file for complete search history.

(56) References Cited

U.S. PATENT DOCUMENTS

| 4,844,591 A | 7/1989 | Arribart et al. |
| 5,995,271 A * | 11/1999 | Zieba ...................... G02F 1/153 |
| | | 359/275 |
| 2013/0115468 A1 | 5/2013 | Kharchenko |
| 2014/0182125 A1 * | 7/2014 | Rozbicki ................. G02F 1/153 |
| | | 29/829 |
| 2016/0194516 A1 * | 7/2016 | Nadaud ............... C03C 17/3644 |
| | | 118/200 |
| 2017/0073525 A1 | 3/2017 | Woronuk et al. |

FOREIGN PATENT DOCUMENTS

| CN | 103003214 A | 3/2013 | |
| CN | 103353700 A | 10/2013 | |
| CN | 105431391 A | 3/2016 | |
| EP | 0 253 713 A1 | 1/1988 | |
| EP | 0 382 623 A1 | 8/1990 | |
| EP | 0 518 754 A1 | 12/1992 | |
| EP | 0 532 408 A1 | 3/1993 | |
| EP | 0 670 346 A1 | 9/1995 | |
| EP | 0 831 360 A1 | 3/1998 | |
| EP | 0 867 752 A1 | 9/1998 | |
| FR | 3 009 302 A1 | 2/2015 | |
| WO | WO 00/57243 A1 | 9/2000 | |
| WO | WO 2017/210320 A1 | 12/2017 | |
| WO | WO 2018/051047 A1 | 3/2018 | |
| WO | WO-2018051047 A1 * | 3/2018 | ............. C03C 17/04 |

OTHER PUBLICATIONS

First Office Action as issued in Chinese Patent Application No. 202080018683.7, dated Aug. 30, 2022.
International Search Report as issued in International Patent Application No. PCT/EP2020/056988, dated May 28, 2020.

* cited by examiner

*Primary Examiner* — Alex A Rolland
(74) *Attorney, Agent, or Firm* — Pillsbury Winthrop Shaw Pittman LLP

(57) ABSTRACT

A process for protecting a glass substrate coated with an electrochromic stack, includes depositing a temporary protective layer on the electrochromic stack, the temporary protective layer including an organic polymeric matrix and having a thickness of between 1 μm and 30 μm, and the temporary protective layer being removable by heat treatment at a temperature of between 300° C. and 500° C., for a period of between 180 s and 240 s.

22 Claims, No Drawings

METHOD FOR PROTECTING A GLASS SUBSTRATE COATED WITH AN ELECTROCHROMIC STACK AND METHOD FOR PRODUCING AN INSULATING GLAZING

The present invention relates to a process for protecting glass substrates coated with an electrochromic stack, and also to a process for producing an insulating glazing comprising an electrochromic stack.

Electrochromic devices are electrochemical devices with electrically controllable optical and/or energy properties. These devices have certain characteristics that can be modified, under the effect of a suitable electrical supply, between a clear state and a tinted state. Said modifiable characteristics are in particular the following: transmission, absorption, reflection of electromagnetic radiation at certain wavelengths, in particular in the visible range and/or in the infrared range, or even the scatter of light. The variation in transmission generally occurs in the optical (infrared, visible, ultraviolet) domain and/or in other domains of electromagnetic radiation, and hence such devices are said to have variable optical and/or energy properties, the optical domain not necessarily being the only domain concerned.

Indeed, these devices used as glazings make it possible, from the thermal/energy point of view, to control solar flux into the interior of rooms or passenger compartments/cockpits when they are employed as exterior architectural glazings or windows of transportation means of the automobile, train, airplane type, and to avoid excessive heating thereof in the case of bright sunshine.

From the optical point of view, they allow the degree of vision to be controlled, this allowing glare to be avoided when they are employed as exterior glazings in the case of bright sunshine. They may also have a particularly advantageous shutter effect, both when they are employed as exterior glazings and when they are employed as interior glazings, for example for equipping interior partitions between rooms (offices in a building), or for isolating compartments in trains or airplanes for example.

The process for producing electrochromic devices requires the preparation of glass substrates coated with a stack of several thin layers of different thickness and different nature, referred to in the present application as "electrochromic stack. The preparation of such substrates for the purpose of the production of electrochromic devices and consequently of insulating glazing often involves various transformation, treatment, manipulation, cutting, transportation, washing and/or storage operations. It is in fact common and practical to carry out the diverse assembly and/or treatment on a site other than that where the substrates carrying the electrochromic stack are produced. These various operations can thus cause impairments/defects such as scratches and any other contamination. Some of these operations can also cause short-circuits within the electrochromic stack, causing a local absence of tint that is very visible to an observer. Contamination or damage reduces the viability and efficiency of the electrochromic stack, in other words causes a decrease in the optical and energy/thermal properties conferred by said stack on the substrates.

Indeed, an electrochromic stack generally comprises a first transparent electrically conductive layer, a layer of electrochromic material, a layer of an ionically conductive electrolyte, a counter electrode layer and a second transparent electrically conductive layer. The glass substrates coated with such an electrochromic stack are very sensitive:

- to mechanical damage, since a slight scratch can cause a short-circuit between the two transparent electrically conductive layers, which can then prevent coloring of the glazing,
- to chemical damage, such as moisture, since the electrolyte containing lithium ions can react with water, which can then lead to degradation of the performance results of the final glazing and in particular degradation of the uniformity and thus of the esthetic appearance of the glazing, and also to a loss of contrast due to a lower absorption of the active layers after chemical damage.

It is known practice to protect an electrochromic stack deposited on a glass substrate with a protective layer based on silica and/or alumina. However, such a layer does not have sufficient scratch resistance and cannot be removed.

Other protective layers that are normally used for the types of substrates described above are mainly transparent films of peelable adhesive polymers. However, these films have the following drawbacks:
- expensive,
- a lengthy and fastidious peeling step that can leave residues, marks on the electrochromic stack when these films are removed, thus causing an impairment to the quality of the final glazing,
- the need to manage the peeled film scraps, and
- the generation of a defect when the film is peeled off, due to its adhesion to the final layer of the electrochromic stack that can cause highly visible local delaminations of the electrochromic stack.

It is also known practice to protect substrates coated with a functional coating using an organic protective layer; said layer is then removed by heat treatment at high temperature of tempering, annealing and/or bending type, that is to say at a temperature greater than 600° C., and this removal step is often followed by a washing step. However, glass substrates coated with an electrochromic stack cannot be tempered. A heat treatment of tempering, annealing and/or bending type would cause crystallization of the layer of electrochromic material which would induce a loss of function and a modification of the microstructure, producing voids and cracks. A very high increase in the leakage current would then also be observed.

There is thus a need to temporarily protect the surface of an electrochromic stack deposited on a glass substrate, during the production, transformation, treatment, manipulation, transportation, washing, storage and/or cutting operations. The temporary protection must be sufficiently durable to allow protection of the surface of the glass substrate coated with the electrochromic stack against both the mechanical and chemical impairments mentioned above and which are specifically linked to the electrochromic stack. The temporary protection must be easily removable. It must be possible for the removal of the temporary protective layer to be carried out at temperatures and over a period of time which do not cause impairments of the electrochromic stack.

To this effect, a subject of the invention is a process for protecting a glass substrate coated with an electrochromic stack, characterized in that it comprises at least the following step:

depositing a temporary protective layer, on said electrochromic stack, comprising an organic polymeric matrix and having a thickness of between 1 μm and 30 μm and, said protective layer being removable by heat treatment at a temperature of between 300° C. and 500° C., for a period of between 180 s and 240 s.

In the present description, the expression "temporary protective layer removable or removed by heat treatment" or "removal of the temporary protective layer by heat treatment" is intended to mean, when it is observed on the final layer of the electrochromic stack:

no residue following said heat treatment, the electrochromic stack is clean, or few residues following said heat treatment, but these residues are easily removed by wiping with a cloth or by washing.

It has been noted, surprisingly, by the inventors that a layer comprising an organic polymeric matrix having a thickness of between 1 μm and 30 μm can temporarily protect an electrochromic stack deposited on a glass substrate and that said layer can be removed by heat treatment at a temperature of between 300° C. and 500° C., for a period of between 180 s and 240 s, that is to say by heat treatment carried out at a temperature lower than that of tempering heat treatment carried out at a temperature of greater than 600° C.; this being without harming the optical and/or energy properties of the substrate bearing the electrochromic stack.

Indeed, the temporary protective layer according to the invention is specifically intended to be removed by heat treatment carried out by means of a firing oven, in particular a firing oven of Naber or Northglass type, at a temperature of between 300° C. and 500° C. sufficient to allow it to be removed by thermal decomposition and for a period of between 180 s and 240 s, the time sufficient to remove said temporary protective layer while at the same time preserving the properties of the electrochromic stack on which the temporary protective layer was deposited.

The heat treatment at a temperature of between 300° C. and 500° C., preferably between 400° C. and 500° C., more preferentially between 400° C. and 450° C., even more preferentially between 400° C. and 420° C. and advantageously equal to 410° C., over a period ranging from 180 s to 240 s, preferably from 200 s to 220 s, and more preferentially from 205 s to 215 s, and the thickness of the protective layer of between 1 μm and 30 μm, preferably between 5 μm and 20 μm, more preferentially between 5 μm and 15 μm and ideally equal to 15 μm, according to the invention, thus makes it possible to selectively heat and remove the temporary protective layer without heating the electrochromic stack and, consequently without affecting the properties of this stack.

The temporary protective layer according to the invention comprises an organic polymeric matrix. The organic polymeric matrix is preferably obtained from a polymerizable liquid composition comprising (meth)acrylate compounds. Its chemical formulation allows rapid and complete combustion during a heat treatment and, during its decomposition, generates only volatile molecules that are easy to remove.

This temporary protective layer can advantageously be water-insoluble, which makes it possible to obtain efficient protection against moisture and during the washing steps.

Surprisingly, the protection is preserved even when the substrate undergoes successive cutting operations. The protective substrates according to the invention can thus be cut several times without the need to modify the protective layer and without losing the mechanical-protection and chemical-protection functions.

A subject of the invention is also a process for producing an insulating glazing comprising a first glass substrate coated with an electrochromic stack, characterized in that said process comprises the following steps:

depositing of a temporary protective layer on said electrochromic stack, said temporary protective layer comprising an organic polymeric matrix and having a thickness of between 1 μm and 30 μm, manipulation and/or transformation and/or treatment and/or transportation and/or washing and/or storage of said protected substrate, removal of said temporary protective layer by heat treatment at a temperature of between 300° C. and 500° C., for a period ranging from 180 s to 240 s, application of bus bars on the electrochromic stack devoid of protective layer, assembly by lamination of the face opposite the glass substrate coated with the electrochromic stack with a counter-glass so as to form a laminated glazing, and assembly of this laminated glazing as an insulating glazing by means of a spacer and of a second glass substrate.

The process may also comprise a cutting step before or after the step of removal of the temporary protective layer. The step of depositing of a temporary protective layer is easily integrated into the process for producing an insulating glazing as described above. The use of a laminated counter-glass in this process makes it possible to ensure the mechanical durability of the insulating glazing.

In the remainder of the text, the preferred embodiments apply in the same way to the various subjects of the invention.

The application of a temporary protective layer obtained from a liquid composition essentially free of solvent and cured preferably by UV irradiation, by IR curing or by electron beam is particularly advantageous. The choice of this solvent-free technology considerably simplifies the industrial implementation of a process comprising a step of applying such a layer. The absence of solvent makes it possible to avoid the installing of a device for drying, recovering, treating solvent vapors which must not be given off into the atmosphere. The modifications that have to be introduced can be limited to inserting at the end of the line a device for depositing for example by coating with a roller coater and also a crosslinking device such as a UV lamp.

The liquid composition can have, by virtue of the judicious choice of the (meth)acrylate compounds, a viscosity suitable for making it possible to easily obtain a temporary protective layer having a thickness preferably of between 5 μm and 20 μm and a reactivity sufficient to allow virtually instantaneous crosslinking over the entire thickness. The chemical nature, the thickener and the degree of crosslinking of the temporary protective layer contribute to obtaining an efficient protection against the appearance of scratches and any other contamination.

Finally, the absence of solvent coupled with the virtually instantaneous curing for example by UV irradiation or by electron beam makes it possible to obtain protected substrates with no effect on production rates. Advantageously, the coating speeds are compatible with the speeds for depositing the layers forming an electrochromic stack, thereby allowing continuous production of the electrochromic devices according to the invention. For example, the speeds of application of the temporary protective layer, comprising for example coating and crosslinking, can be between 5 and 50 m/min on a substrate 0.2 m to 3.3 m wide.

The glass substrate according to the invention is a substrate of soda-lime-silica type and has a thickness of between 1.5 mm and 6 mm, preferably a thickness equal to 2.1 mm. The glass substrate is preferably of the floated type, that is to say capable of having been obtained by a process consisting in pouring the molten glass onto a bath of molten tin ("float" bath).

The electrochromic stack according to the invention comprises, in order starting from a first glass substrate or in reverse order:
- a first transparent electrically conductive layer,
- a layer of electrochromic material, capable of reversibly and simultaneously inserting ions, the oxidation states of which, corresponding to the states inserted and ejected, have a distinct color when they are subjected to an appropriate electrical supply; one of these states having a light transmission higher than the other,
- a layer of ionically conductive electrolyte,
- a counter electrode layer, capable of reversibly inserting ions of the same charge as those that the electrochromic material can insert,
- a second transparent electrically conductive layer.

As an alternative, the order of the layers between the two transparent conductive layers can be reversed: counter electrode then electrolyte and, finally, electrochromic material.

The electrochromic material is preferably based on tungsten oxide (cathodic electrochromic material) or on iridium oxide (anodic electrochromic material). These materials can insert cations, in particular protons or lithium ions.

The counter electrode preferably consists of a layer which is color-neutral or, at least, transparent or barely colored when the electrochromic layer is in the colored state. The counter electrode is preferably based on an oxide of an element chosen from tungsten, nickel, iridium, chromium, iron, cobalt and rhodium, or based on a mixed oxide of at least two of these elements, in particular the mixed tungsten nickel oxide. If the electrochromic material is tungsten oxide, and thus a cathodic electrochromic material, the colored state of which corresponds to the most reduced state, an anodic electrochromic material based on nickel oxide or iridium oxide can be for example used for the counter electrode. It can in particular be a layer of mixed tungsten vanadium oxide or of mixed tungsten nickel oxide. If the electrochromic material is iridium oxide, a cathodic electrochromic material, for example based on tungsten oxide, can act as counter electrode. It is also possible to use a material that is optically neutral in the oxidation states in question, such as, for example, cerium oxide or organic materials such as electronically conductive polymers (polyaniline) or Prussian blue.

According to a first embodiment, the electrolyte is in the form of a polymer or of a gel, in particular a proton-conducting polymer, for example such as those described in European patents EP 0 253 713 and EP 0 670 346, or a lithium ion-conducting polymer, for example such as those described in patents EP 0 382 623, EP 0 518 754 or EP 0 532 408. These are then referred to as mixed electrochromic systems.

According to a second embodiment, the electrolyte consists of a mineral layer forming an ion conductor which is electrically insulated. These electrochromic systems are then denoted as being "all-solid-state". Reference may in particular be made to European patents EP 0 867 752 and EP 0 831 360.

The electrochromic stack according to the invention may also be of the "all polymer" type in which two electrically conductive layers are placed on either side of a stack comprising a cathodically colored polymer, an electronically insulating, ionically conductive ($H^+$ or $Li^+$ conductive most particularly) polymer and, finally, an anodically colored polymer (such as polyaniline or polypyrrole).

The electrochromic stack may also comprise various layers, in particular underlayers, preferably based on oxides, overlayers, preferably based on oxides, or intermediate layers, intended for example to facilitate the depositing of a subsequent layer, or to protect certain layers against mechanical or chemical attacks (resistance to corrosion, to abrasion etc.).

The electrochromic stack may for example be surmounted by a protective layer based on silica and/or on alumina.

Of course, the two electrically conductive electrodes must be joined to respective current lead connectors. This connection is customarily obtained by means of metal foils which are respectively brought into contact with the first electrode and with the second electrode. The current leads may also be obtained by means of a screen printing technique, in particular based on silver which can also be deposited on the second transparent electrically conductive layer, in particular in the form of bus bars.

According to one preferred embodiment, the electrochromic stack is preferably "all-solid-state" and comprises successively starting from the substrate:
- a first electrically conductive layer, preferably based on ITO, having a thickness of 390 nm; as a variant, it may be a layer of tin oxide doped with fluorine or with antimony, or a multilayer comprising a stack of layers of the ITO/ZnO:Al/Ag/ZnO:Al/ITO type, in particular of respective thicknesses 15 to 20 nm for the ITO/60 to 80 nm for the ZnO:Al/3 to 15 nm for the silver/60 to 80 nm for the ZnO:Al/15 to 20 nm for the ITO,
- a layer of cathodic electrochromic material, preferably based on tungsten oxide $WO_3$ or of mixed tungsten vanadium oxide, having a thickness of 400 nm,
- a layer of an ionically conductive electrolyte, preferably consisting of a silicon oxide layer, typically 15 nm in thickness,
- an anodic counter electrode layer, preferably of an oxide of a tungsten-nickel alloy, having a thickness of 270 nm of thickness,
- a second transparent electrically conductive layer, preferably based on ITO, having a thickness of 420 nm, or on $SnO_2$:F, or, as a variant, an upper electrically conductive layer comprising other conductive elements: it may be a question more particularly of combining the electrically conductive layer with a layer that is more conductive than itself, and/or with a plurality of conductive strips or wires. For further details, reference will be made to application WO-00/57243 for the use of such multi-component electrically conductive layers.

According to another preferred embodiment, the electrochromic stack above also comprises:
- an underlayer, preferably based on niobium oxide, having a thickness of 5 nm, and
- an underlayer, preferably based on silicon oxide, having a thickness of 30 nm, said underlayers being located upstream of the first transparent electrically conductive layer, and
- an overlayer, preferably based on silicon oxide, having a thickness of 70 nm, said overlayer being located downstream of the second transparent electrically conductive layer.

All of the layers are preferably deposited by magnetron sputtering. As a variant, the deposition could be obtained by thermal evaporation or electronic-beam evaporation, by laser ablation, by CVD, optionally plasma-enhanced or microwave-enhanced CVD, or by an atmospheric pressure technique, in particular by the deposition of layers by sol-gel synthesis, in particular of dip-coating, spray-coating or laminar flow coating type.

The temporary protective layer can have a thickness between 5 μm and 20 μm, preferably between 5 μm and 15 μm and is ideally equal to 15 μm.

The temporary protective layer has a grammage of between 5 and 50 g/m², preferably between 10 and 30 g/m².

The temporary protective layer comprises an organic polymeric matrix which can be obtained from a polymerizable liquid composition comprising (meth)acrylate compounds. The (meth)acrylate compounds having reacted with one another can represent at least 90% by weight of the weight of the temporary protective layer.

The term "(meth)acrylate" is intended to mean an acrylate or a methacrylate. The term "(meth)acrylate compounds" is intended to mean the esters of acrylic or methacrylic acid comprising at least one acroyl ($CH_2$=CH—CO—) or methacroyl ($CH_2$=CH($CH_3$)—CO—) function. These esters may be monomers, oligomers, prepolymers or polymers. (Meth)acrylate compounds, when they are subjected to the polymerization conditions, give a polymer network which has a solid structure.

The (meth)acrylate compounds used according to the invention can be chosen from monofunctional and polyfunctional (meth)acrylates such as mono-, di-, tri-, polyfunctional (meth)acrylates. Examples of such monomers are:
  monofunctional (meth)acrylates such as methyl (meth)acrylate, ethyl (meth)acrylate, n- or tert-butyl (meth)acrylate, hexyl (meth)acrylate, cyclohexyl (meth)acrylate, 2-ethylhexyl (meth)acrylate, benzyl(meth)acrylate, 2-ethoxyethyl (meth)acrylate, phenyloxyethyl (meth)acrylate, hydroxyethyl acrylate, hydroxypropyl (meth)acrylate, vinyl (meth)acrylate, caprolactone acrylate, isobornyl methacrylate, lauryl methacrylate, polypropylene glycol monomethacrylate,
  difunctional (meth)acrylates such as 1,4-butanediol di(meth)acrylate, ethylene dimethacrylate, 1,6-hexanediol di(meth)acrylate, bisphenol A di(meth)acrylate, trimethylolpropane diacrylate, triethylene glycol diacrylate, ethylene glycol di(meth)acrylate, polyethylene glycol di(meth)acrylate, tricyclodecane dimethanol diacrylate,
  trifunctional (meth)acrylates such as trimethylolpropane trimethacrylate, trimethylolpropane triacrylate, pentaerythritol triacrylate, ethoxylated trimethylolpropane triacrylate, trimethylolpropane trimethacrylate, tripropylene glycol triacrylate,
  (meth)acrylates of higher functionality such as pentaerythritol tetra(meth)acrylate, ditrimethylpropane tetra(méth)acrylate, dipentaerythritol penta(meth)acrylate or hexa(meth)acrylate.

According to one advantageous embodiment, the temporary protective layer does not comprise mineral filling material such as fillers or pigments. The temporary protective layer also does not comprise additives that cannot be removed during the heat treatment, such as organic compounds comprising silicon- of siloxane type.

According to advantageous embodiments of the invention, the liquid composition of the temporary protective layer has the following characteristics:
  the liquid composition comprises less than 20% by weight of solvent relative to the total weight of the liquid composition,
  the liquid composition comprises less than 10% by weight of solvent relative to the total weight of the liquid composition,
  the liquid composition is solvent free,
  the liquid composition has a viscosity, measured at 25° C. using a rheometer of the type Anton Paar model MCR92 with a cone-plate geometry:
    of at least 0.05 Pa·s, of at least 0.08 Pa·s, of at least 0.1 Pa·s, of at least 0.50 Pa·s,
    of at most 5 Pa·s, of at most 2 Pa·s,
    of between 0.05 and 5 Pa·s,
  the liquid composition comprises at least one polymerization initiator, preferably a photoinitiator,
  the polymerization initiator represents from 0.1 to 20%, or from 1 to 15%, preferably from 5 to 15% and better still from 8 to 12% by weight of the total weight of the (meth)acrylate compounds,
  the liquid composition also comprises at least one additive chosen from plasticizers, absorbing agents, separating agents, heat-stabilizers and/or light-stabilizers, thickeners or surface modifiers,
  the sum of all the additives is between 0 and 5% by weight of the weight of the liquid composition,
  the liquid composition comprises (meth)acrylate compounds chosen from acrylic or methacrylic acid esters comprising at least two acroyl ($CH_2$=CH—CO—) or methacroyl ($CH_2$=CH($CH_3$)—CO—) functions,
  the liquid composition comprises, by weight relative to the total weight of the (meth)acrylate compounds, in increasing order of preference, at least 50%, at least 60%, at least 70%, at least 80%, at least 90%, 100% of (meth)acrylate compounds chosen from acrylic or methacrylic acid esters comprising at least two acroyl ($CH_2$=CH—CO—) or methacroyl ($CH_2$=CH($CH_3$)—CO—) functions,
  the liquid composition comprises:
    at least one aliphatic urethane-acrylic oligomer,
    at least one (meth)acrylate monomer chosen from mono-, bi- or tri-functional (meth)acrylate monomers,
    at least one polymerization initiator,
  the liquid composition comprises:
    at least one aliphatic urethane-acrylic oligomer,
    at least one difunctional (meth)acrylate monomer,
    at least one trifunctional (meth)acrylate monomer,
    at least one polymerization initiator, preferably a photoinitiator,
  the liquid composition comprises, by weight relative to the total weight of the (meth)acrylate compounds:
    30 to 80% by weight of at least one aliphatic urethane-acrylic oligomer,
    20 to 70% by weight of at least one (meth)acrylate monomer chosen from a mono-, bi- or tri-functional (meth)acrylate.

According to the invention, the polymerization initiators are not considered to be additives.

The liquid composition can be applied at ambient temperature by any known means and in particular by roller-coating, flow-coating, curtain-coating or spray-coating. The liquid composition is preferentially applied by roller-coating. The rate of deposition of the liquid composition may be between 1 and 90 m/min.

The temporary protective layer can be cured:
  by drying at a temperature of less than 200° C. for a period ranging for example from 10 s to 180 s,
  by UV crosslinking (various wavelengths) preferably in the open air and at ambient temperature or
  by an electron beam.

The liquid composition also comprises a polymerization initiator, the nature of which depends on the type of curing chosen. For example, in the case of thermal curing, initiators of benzoyl peroxide type are used. In the case of curing by UV radiation, initiators referred to as photoinitiators are used.

The protection process according to the invention comprises a step of removal of said temporary protective layer by specific heat treatment combining both a temperature of between 300° C. and 500° C., preferably between 400° C. and 500° C., more preferentially between 400° C. and 450° C., even more preferentially between 400° C. and 420° C. and advantageously which is equal to 410° C., and a period of between 180 s and 240 s, preferably between 200 s and 220 s, more preferentially between 205 s and 215 s, without impairing the properties on the electrochromic stack on which the protective layer was deposited.

According to one preferred embodiment, the step of removal of the temporary protective layer by heat treatment is followed by a step of wiping with a cloth or washing, with the aim of completely removing the temporary protective layer previously deposited on the electrochromic stack. This removal of the temporary layer can therefore be carried out dry or wet, by means of an aqueous solution or of a solvent. It may for example involve water, in particular water that has been acidified, for example using acetic acid, citric acid or any other acid. The solvent may also be an alcohol, for example ethanol, propanol or isopropanol. The washing can be carried out with or without the use of brushes.

As mentioned above, the invention also relates to a process for producing an insulating glazing. The process for producing an insulating glazing comprises, compared to the process for protecting a glass substrate coated with an electrochromic stack as described above:

additional steps of manipulation and/or transformation and/or treatment and/or transportation and/or washing and/or storage of said protected substrate before the step of removal of the temporary protective layer, and
additional steps, after the step of removal of the temporary protective layer, which are the following:
application of bus bars on the electrochromic stack devoid of protective layer,
assembly by lamination of the face opposite the glass substrate coated with the electrochromic stack with a counter-glass so as to form a laminated glazing, and
assembly of this laminated glazing as an insulating glazing by means of a spacer and of a second glass substrate;

the first substrate being that on which the electrochromic stack is deposited.

The two glass substrates are consequently assembled so as to form an insulating glazing by means of a spacer.

Several embodiments are then possible: the two substrates can be laminated, in the sense that a lamination polymer (in particular based on polyvinylbutyral, on an ethylene and vinyl acetate—EVA-copolymer or else on polyurethane) is placed in contact between the first glass substrate coated with its stack and the second substrate.

The two substrates can alternatively be mounted as a double glazing, in the sense that the second substrate is kept apart from the first, generally by means of a peripheral frame, thus enabling a layer of gas between the two substrates. The gas is in particular argon. In this case, the electrochromic stack is placed between the two substrates.

According to the present invention, the temporary protective layer is deposited on a complete electrochromic stack, in particular during the process for producing an insulating glazing, which allows the manipulation, transformation, treatment, transportation, washing or storage of the glass substrate coated with said electrochromic stack comprising numerous layers, and thus makes it possible to avoid mechanical and/or chemical impairments of said stack during the abovementioned various operations. It should be noted that impairments on a complete electrochromic stack cause tint defects, which are either isolated defects that are extremely visible because of a short-circuit of the electrically conductive layers, leading to an absence of local tint ("shorts"), or are general defects of non-uniformity of tint of the glazing on the scale of a few tens of cm or of a meter.

The temporary protective layer is then removed during the process for producing an insulating glazing by specific heat treatment: at a temperature between 300° C. and 500° C., over the course of a period ranging from 180 s to 240 s, without affecting the properties of the various layers of the electrochromic stack.

Furthermore, all of the layers constituting the electrochromic stack according to the invention are deposited by magnetron sputtering under vacuum. Thus, it is advantageous to cover a complete electrochromic stack in an installation in order to prevent the vacuum from being broken during the production of an insulating glazing.

EXAMPLES

The substrates used hereinafter are glass substrates coated with an electrochromic stack (of size 1.5 m×3 m, having bus bars separated by 1.5 m) successively provided:

with a first electrically conductive layer of ITO of 390 nm,
with a layer comprising electrochromic material based on $WO_3$ of 400 nm comprising lithium ions,
with a layer of an ionically conductive electrolyte of silicon oxide of 15 nm,
with a counter electrode layer of an oxide of a tungsten nickel alloy of 270 nm comprising lithium ions, and
with a final electrically conductive layer of ITO of 420 nm.

A temporary protective layer comprising an organic polymeric matrix of thickness equal to 15 µm is deposited on said electrochromic stack. The temporary protective layer used in the examples is a liquid composition prepared using a mixture of oligomers and monomers comprising at least one acrylate function, sold by the company Sartomer:

CN9276: tetrafunctional aliphatic urethane-acrylate oligomer,
SR351: trimethylolpropane triacrylate, trifunctional acrylate monomer,
SR833S: tricyclodecane dimethanol diacrylate, difunctional acrylate monomer.

The substrates are subjected to heat treatment by means of a firing oven of Nabertherm or Northglass type at a temperature of 410° C. for a period of 210 s (Example 1, according to the invention), of 150 s (Example 2, according to Comparative Example 1) and of 360 s (Example 3, according to Comparative Example 2).

For each of the examples, certain characteristic properties of the electrochromic glazing are measured after the heat treatment. The examples hereinafter show that only the examples according to the invention make it possible to preserve the expected specifications after heat treatment.

The properties required for an electrochromic stack of size 1.5 m×3 m, having bus bars separated by 1.5 m, are in particular defined by the following parameters:

a full tint transmission: "Tint % T" (in %) of less than 1,
a time in seconds to reach 5% light transmission starting from a clear state to an off state: "Time to 5%" (in s) less than 900, a resistance of the final electrically conductive layer: "Top TCO RSq" (in Ω) less than 7, and a colorimetric variation: "ΔE" less than 7 within the glazing.

The transmission colorimetric variation "ΔE" was calculated. For that:
- the L*a*b* transmission color measurements, expressed in the CIE system, are measured according to the illuminant D65 on the complete glazing,
- the glazing is subdivided into equal surface partitions and the mean values of L*, a* and b* are determined for each partition (from the measurement on the complete glazing),
- the colorimetric difference between 2 partitions is calculated by $(\Delta a^{*2}+\Delta b^{*2}+\Delta L^{*2})^{1/2}$. This difference is calculated between each partition and all of the other partitions (for example 10 partitions, between partition 1 and partitions 2 to 10, then between 2 and 3 to 10 etc.).

The magnitude ΔE is determined as the maximum value of the colorimetric differences between the partitions of the glazing after heat treatment.

In the examples below, the term "removable or removed protective layer" is intended to mean, when it is observed on the final layer of the electrochromic stack, that the protective layer is sufficiently degraded and its adhesion sufficiently weak for it to be possible for it to be easily removed by wiping with a cloth or washing.

Example 1

| T° C. (heat treatment) | Period (s) | State of the protective layer | Tint % T (%) | Time to 5% T(s) | Top TCO Rsq (Ω) | ΔE |
|---|---|---|---|---|---|---|
| 410 | 210 | removable | 0.9% | 830 | 6.8 | 5.5 |

This test carried out (according to the invention) at a temperature of 410° C. (T° C. of between 300° C. and 500° C.) and for a period 210 s (period of between 180 s and 240 s) shows that the temporary protective layer is removed by heat treatment combining both a specific temperature and a specific period, without affecting the properties of the electrochromic stack. The properties of the electrochromic stack are in fact at the expected level since Tint % T<1%, Time to 5%<900 s, Top TCO Rsq<7 Ω and ΔE<7.

Example 2

| T° C. (heat treatment) | Period (s) | State of the protective layer | Tint % T (%) | Time to 5% T(s) | Top TCO Rsq (Ω) | ΔE |
|---|---|---|---|---|---|---|
| 410 | 150 | non-removable | 1.2% | 1050 | 6.8 | 12.5 |

In this example, it is noted that the heat treatment period is too short to allow the protective polymer layer to be removed. Furthermore, the lithium diffusion in the counter electrode layer of the stack is probably not adequate, thus resulting in suboptimal performance results of the electrochromic stack. The electrochromic stack does not in this case exhibit good properties since Tint % T>1%, Time to 5%>900 s, and ΔE>7.

Example 3

| T° C. (heat treatment) | Period (s) | State of the protective layer | Tint % T (%) | Time to 5% T(s) | Top TCO Rsq (Ω) | ΔE |
|---|---|---|---|---|---|---|
| 410 | 360 | removable | 1.4% | 1150 | 7.7 | 11 |

In this example, the heat treatment period is sufficiently long to remove the protective polymer layer. However, the properties of the electrochromic stack are impaired, in particular because of the oxidation of the lithium and the overoxidation of the final layer of ITO (since Tint % T>1%, Time to 5%>900 s, Top TCO Rsq>7 Ω and ΔE>7).

Thus, it was shown that the specific combination of the heat-treatment temperature and period according to the invention make it possible to remove the temporary protective layer, without harming the properties of the electrochromic stack.

The invention claimed is:

1. A process for protecting a glass substrate coated with an electrochromic stack, comprising:
   depositing a temporary protective layer on said electrochromic stack, said electrochromic stack including a layer of electrochromic material, said temporary protective layer comprising an organic polymeric matrix and having a thickness between 1 μm and 30 μm, and
   removing said temporary protective layer by heat treatment at a temperature between 300° C. and 500° C. for a period of between 180 s and 240 s such that the temporary protective layer deposited on said glass substrate coated with said electrochromic stack is removed without tempering, bending or annealing said glass substrate during said heat treatment and without crystallizing said layer of electrochromic material during said heat treatment.

2. The process for protecting a glass substrate coated with an electrochromic stack as claimed in claim 1, wherein the temporary protective layer has a thickness between 5 μm and 20 μm.

3. The process for protecting a glass substrate coated with an electrochromic stack as claimed in claim 2, wherein the temporary protective layer has a thickness between 5 μm and 15 μm.

4. The process for protecting a glass substrate coated with an electrochromic stack as claimed in claim 3, wherein the temporary protective layer has a thickness of 15 μm.

5. The process for protecting a glass substrate coated with an electrochromic stack as claimed in claim 1, wherein the temperature of the heat treatment is between 400° C. and 500° C.

6. The process for protecting a glass substrate coated with an electrochromic stack as claimed in claim 3, wherein the temperature of the heat treatment is between 400° C. and 450° C.

7. The process for protecting a glass substrate coated with an electrochromic stack as claimed in claim 6, wherein the temperature of the heat treatment is between 400° C. and 420° C.

8. The process for protecting a glass substrate coated with an electrochromic stack as claimed in claim 1, wherein the heat treatment period is between 200 s and 220 s.

9. The process for protecting a glass substrate coated with an electrochromic stack as claimed in claim 4, wherein the heat treatment period is between 205 s and 215 s.

10. The process for protecting a glass substrate coated with an electrochromic stack as claimed in claim 1, wherein the heat treatment is carried out by a firing oven.

11. The process for protecting a glass substrate coated with an electrochromic stack as claimed in claim 1, wherein the organic polymeric matrix is obtained from a polymerizable liquid composition comprising (meth)acrylate compounds.

12. The process for protecting a glass substrate coated with an electrochromic stack as claimed in claim 6, wherein the (meth)acrylate compounds having reacted with one another represent at least 90% by weight of the weight of the temporary protective layer.

13. The process for protecting a glass substrate coated with an electrochromic stack as claimed in claim 6, wherein the polymerizable liquid composition comprising (meth) acrylate compounds comprises less than 20% by weight of solvent relative to the total weight of the liquid composition and a viscosity, measured at 25° C., of between 0.05 and 5 Pa·s.

14. The process for protecting a glass substrate coated with an electrochromic stack as claimed in claim 1, wherein the temporary protective layer is deposited on the electrochromic stack by roller-coating.

15. The process for protecting a glass substrate coated with an electrochromic stack as claimed in claim 1, wherein the removal of said temporary protective layer by the heat treatment is followed by a step of wiping with a cloth or of washing.

16. The process for protecting a glass substrate coated with an electrochromic stack as claimed in claim 1, wherein the process is free of a step of heat treatment of tempering.

17. The process for protecting a glass substrate coated with an electrochromic stack as claimed in claim 1, wherein the electrochromic stack comprises successively the following layers starting from the substrate:
    a first transparent electrically conductive layer having a thickness of 390 nm,
    a layer of electrochromic material having a thickness of 400 nm,
    a layer of an ionically conductive electrolyte having a thickness of 15 nm,
    a counter electrode layer having a thickness of 270 nm,
    a second transparent electrically conductive layer having a thickness of 420 nm.

18. The process for protecting a glass substrate coated with an electrochromic stack as claimed in claim 12, wherein the electrochromic stack further comprises:
    a first underlayer having a thickness of 5 nm, and
    a second underlayer having a thickness of 30 nm, said first and second underlayers being located under the first transparent electrically conductive layer, and
    an overlayer having a thickness of 70 nm,
    said overlayer being located above the second transparent electrically conductive layer.

19. The process for protecting a glass substrate coated with an electrochromic stack as claimed in claim 1, wherein the temperature of the heat treatment is between 400° C. and 450° C. and the heat treatment period is between 200 s and 220 s.

20. The process for protecting a glass substrate coated with an electrochromic stack as claimed in claim 19, wherein a thickness of the glass substrate is between 1.5 mm and 3.5 mm, or wherein the thickness of the glass substrate is 6 mm.

21. A process for producing an insulating glazing comprising a first glass substrate coated with an electrochromic stack, the process comprising:
    depositing of a temporary protective layer on said electrochromic stack, said electrochromic stack including a layer of electrochromic material, said temporary protective layer comprising an organic polymeric matrix and having a thickness of between 1 μm and 30 μm,
    performing a manipulation and/or transformation and/or treatment and/or transportation and/or washing and/or storage of said protected substrate,
    removing said temporary protective layer by heat treatment at a temperature of between 300° C. and 500° C., for a period ranging from 180 s to 240 s such that the temporary protective layer deposited on said glass substrate coated with said electrochromic stack is removed during said heat treatment without tempering, bending or annealing said glass substrate and without crystallizing said layer of electrochromic material,
    applying bus bars on the electrochromic stack devoid of protective layer,
    assembling by lamination of the face opposite the glass substrate coated with the electrochromic stack with a counter-glass so as to form a laminated glazing, and
    assembling the laminated glazing as an insulating glazing by a spacer and of a second glass substrate.

22. The process for producing an insulating glazing as claimed in claim 14 also comprising a cutting step before or after removing the temporary protective layer.

\* \* \* \* \*